United States Patent [19]

Northrop

[11] Patent Number: 5,267,614
[45] Date of Patent: Dec. 7, 1993

[54] METHOD FOR DISPOSING OF WASTE GAS IN SUBTERRANEAN FORMATIONS

[75] Inventor: Paul S. Northrop, Carrollton, Tex.

[73] Assignee: Mobil Oil Corporation, Fairfax, Va.

[21] Appl. No.: 881,274

[22] Filed: May 11, 1992

[51] Int. Cl.$^5$ .............................................. E21B 43/22
[52] U.S. Cl. .................................... 166/270; 166/369
[58] Field of Search ................................ 166/270–275, 166/295

[56] References Cited

U.S. PATENT DOCUMENTS

| | | | |
|---|---|---|---|
| 4,694,906 | 9/1987 | Hutchins et al. | 166/273 |
| 4,706,752 | 11/1987 | Holm | 166/273 |
| 4,836,281 | 6/1989 | Robin et al. | 166/273 |
| 4,856,589 | 8/1989 | Kuhlman et al. | 166/273 |
| 4,911,238 | 3/1990 | Lau et al. | 166/273 |
| 5,027,898 | 7/1991 | Naae | 166/273 |

Primary Examiner—Ramon S. Britts
Assistant Examiner—Frank S. Tsay
Attorney, Agent, or Firm—A. J. McKillop; G. W. Hager

[57] ABSTRACT

A method for safely disposing of a waste gas from produced hydrocarbons. The waste gas is mixed with a surfactant to form a foam which, in turn, is placed within a disposal zone of a subterranean formation. The waste gas is effectively "trapped" within the foam thereby substantially reducing the mobility of the gas in the formation which, in turn, restricts the ability of the waste gas to readily flow out of the disposal zone and into the producing zone of the formation. The waste gas foam can be placed into the formation by coinjecting the surfactant and the waste gas or it can be formed in situ by first injecting the surfactant and then injecting the waste gas.

6 Claims, No Drawings

METHOD FOR DISPOSING OF WASTE GAS IN SUBTERRANEAN FORMATIONS

DESCRIPTION

1. Technical Field

The present invention relates to the disposal of gas in subterranean formations and in one of its aspects relates to a method for disposing of waste gas from hydrocarbon production wherein the gas is injected into a spent zone of a producing formation along with a foam which reduces the mobility of the gas within the formation and thereby minimizes the possibility of early breakthrough of the waste gas at well(s) which are producing fluids from the formation.

2. Background Art

It is common for many hydrocarbon reservoirs to produce gas which has low BTU content and high carbon dioxide concentrations (typically called "waste gas") along with the more valuable hydrocarbons. It is also common for such waste gas to be contaminated with trace amounts of hydrogen sulfide which, as is well known, is particularly hazardous to the environment. Accordingly, disposal of the waste gas after it is separated from the other produced fluids presents a real problem in commercially producing such reservoirs.

Several techniques have been proposed for disposing of waste gas in an ecologically-acceptable manner. One such well known disposal technique involves mixing the waste gas with a higher BTU gas and then burning the resulting mixture as fuel at or near the production site, e.g. fuel to generate steam for reinjection into the producing formation to heat heavy oil and the like. Burning of waste gas as fuel, however, normally requires that the gas first be treated to remove any hydrogen sulfide that may be present in the waste gas. This requires relatively expensive equipment which, in turn, routinely experiences substantial downtime (e.g. 10% or more) during normal operation. Since it is desirable to continue the production of hydrocarbons even during periods when the gas treating equipment is down, disposal of the waste gas again presents a problem since it can not be burned during these periods.

Other proposed techniques for disposing of waste gas have involved injecting the waste gas through an injector well directly into a depleted or spent zone of the formation from which the gas was produced. For example, in a heavy oil reservoir where steam is injected to heat the oil to reduce its viscosity, it has been proposed that waste gas from the production be injected into the steamed-out, already produced zones of the formation. However, due to the high diffusivity of the waste gas within a typical producing formation, the waste gas has a tendency to quickly and easily flow from the steamed-out zone, through the hydrocarbon producing zone, and to the production well(s) to be produced again with the hydrocarbons. This "early breakthrough" of the waste gas at the producing wells seriously detracts from the apparent benefits otherwise derived from this disposal technique since the waste gas is "reproduced" and accordingly, has to be "redisposed of" which, in turn, substantially adds both to the problems of handling the waste gas and to the costs involved.

SUMMARY OF THE INVENTION

The present invention provides a method for safely disposing of a gas in a subterranean formation. The gas, e.g. a waste gas separated from produced hydrocarbons, is used to form a foam which, in turn, is placed within a disposal zone of a subterranean formation (e.g. a spent or previously-produced zone of a hydrocarbon-producing formation). The waste gas is effectively "trapped" within the foam thereby substantially reducing the mobility of the gas in the formation which, in turn, restricts the ability of the waste gas to readily flow out of the disposal zone and into the producing zone of the formation.

The waste gas foam is formed by combining the waste gas with a foam-forming surfactant mixture, e.g. surfactant and water or brine. Any commonly-known, foam-forming surfactant can be used to form the foam. The waste gas foam can be placed into the formation by coinjecting the surfactact-liquid mixture and the waste gas or it can be formed in situ by first injecting the surfactant mixture into the formation and then injecting the waste gas. Due to the inherent properties of foam, the waste gas is effectively trapped therein and can not readily escape out of the disposal zone into which it is injected.

While the present invention is applicable for disposing of almost any gas in almost any acceptable subterranean formation, its use is particularly applicable for disposing of the low BTU and high carbon dioxide gases which are routinely produced from a heavy oil reservoir during a steaming operation. In a typical steaming operation, the waste gas is separated from the produced hydrocarbons and water. A waste gas foam is then formed by mixing the waste gas with a surfactant-liquid mixture and this foam is placed for disposal into the zone of the formation from which the hydrocarbons were produced.

Further, in order to minimize the chance that the waste gas foam will breakdown and will release substantial amounts of the waste gas back into the producing zone of the formation, a slug of "inert-gas" foam (e.g. foam formed with inert gas, e.g. nitrogen, instead of waste gas) may be placed in the formation before the waste gas foam is injected therein. The inert gas provides a buffer between the hydrocarbons in the production zone and the waste gas in the disposal zone so any breakdown of foam releases only inert gas which can be produced with the produced fluids without creating any additional disposal problems. Still further, a slug of the inert gas foam can be injected into the disposal zone after the waste gas foam has been placed in those instances where the injection well may later be converted to a producing well.

BEST KNOWN MODE FOR CARRYING OUT THE INVENTION

In producing hydrocarbons from a subterranean formation, major consideration must be given to the safe disposal of unwanted fluids which are produced along with the valuable hydrocarbons. One such unwanted fluid is a gas commonly called "waste gas". Typically, waste gas is a gas which has a low BTU content and/or a relatively high carbon dioxide content which normally makes its use as a fuel impractical from an economical standpoint. Also, many waste gases of this type contain hydrogen sulfide which further detracts from its use as a fuel and which significally adds to the problems associated with the proper disposal of the gas.

Several methods have been proposed for disposing of these waste gases; one of which involves injecting the gas directly into a spent or previously-produced zone of a formation from which it was originally produced. However, due to the high diffusivity of gas in a typical producing formation, the waste gas quickly escapes from the spent zone and flows back into the producing zone of the formation where it "breaks-through" at the producing wells to be again produced with the production fluids. The necessity of "reproducing" and "rehandling" large volumes of waste gas which has already been produced and disposed of once seriously detracts from the use of this gas disposal method.

In the present invention, the waste gas which is to be disposed of is used to form a foam which, in turn, is placed within a disposal zone of a subterranean formation (e.g. a spent or previously-produced zone of a hydrocarbon-producing formation). The waste gas is effectively "trapped" within the foam thereby substantially reducing the mobility of the gas in the formation which, in turn, restricts the ability of the waste gas to readily flow out of the disposal zone and into the producing zone of the formation. By effectively containing the waste gas in the disposal zone, substantially greater volumes of waste gas can be disposed of into the formation before any substantial break-through of the injected waste gas is experienced at the production wells.

The foam of the present invention is formed by combining a foam-forming surfactant mixture with the waste gas. The foam-forming mixture, in turn, is formed by mixing an active surfactant (e.g. from about 0.1% to about 2.0% by weight) with an aqueous liquid such as water or brine. Any commonly-known, foam-forming surfactant can be used; e.g. known active surfactants of the type used in forming foams for injecting into producing formations during a steaming operation to divert injected steam from intervals of low oil saturation to intervals of high oil saturation in the formation. Examples of surfactants which can be used to form a foam with the waste gas are: linear toluene sulfonate; alpha olefin sulfonates and disulfonates; ether acetate; dinonylophenol, etc.; all of which are well known and commercially available.

The waste gas foam can be placed into the formation for disposal in different manners. One technique for placing the foam in a disposal zone of the formation is to mix the surfactact-liquid mixture at the surface and then simultaneously inject both the mixture and the waste gas down the injection well. As the gas and the mixture combine during coinjection, they form a foam which flows out of the injection well and into the permeable channels of the disposal zone of the formation. Due to the inherent properties of foam, the waste gas is effectively trapped therein and can not readily escape out of the disposal zone into which it is injected.

Another technique for placing the waste gas foam into a formation is to mix the surfactant-liquid mixture at the surface and inject into the disposal zone of the formation. After the surfactant-liquid mixture is in place, the waste gas is then injected into the formation where it contacts and reacts with the surfactant-liquid mixture to form the waste gas foam in situ. Again, the waste gas is "trapped" within the foam and is thereby effectively contained in the disposal zone.

While the present invention is applicable for disposing of almost any gas in almost any acceptable subterranean formation, its use is particularly applicable for disposing of the low BTU and high carbon dioxide gases which are routinely produced from a heavy oil reservoir during a steaming operation. In a typical, "steaming operation", steam is injected into a zone of a heavy oil formation to heat the oil and reduce its viscosity so that the oil and related fluids will flow from the "steam-swept" zone towards a producing well(s). This swept or "previously-produced" zone now offers a substantial volume in which waste gas can be injected for disposal.

In a steaming operation in accordance with the present invention, the waste gas is separated from the produced hydrocarbons and water. A foam is then formed by mixing the waste gas with a surfactant-liquid mixture and is placed in the zone of the formation from which the hydrocarbons were produced. Since foams are commonly injected into the steamed-out or swept zones of a producing formation to divert the injected steam into higher oil concentration zones (i.e. unswept or unproduced zones), the waste gas foam also provides this function in addition to immobilizing the waste gas in the disposal zone of the formation.

Further, in order to minimize the chance that the waste gas foam will breakdown and release substantial amounts of waste gas back into the producing zone of the formation, a slug of "inert-gas" foam may be placed in the formation before the waste gas foam is placed therein. "Inert gas" foam is a foam which is formed by mixing an inert gas, e.g. nitrogen, instead of waste gas with a surfactant-liquid mixture as described above. The inert gas foam may be placed in the disposal zone by coinjecting the surfactant mixture and the inert gas or it may be placed by forming the foam in situ as described above. The inert gas foam fills at least a portion of the disposal zone and is diplaced by the subsequent placement of the waste gas foam. The inert gas provides a buffer between the hydrocarbons in the production zone and the waste gas in the disposal zone. Now if the foam (i.e. inert gas foam) adjacent the production zone breaks down, only inert gas, e.g. nitrogen, will be released into the production zone and this gas can be produced along with the produced fluids without creating any additional disposal problems since it can easily be disposed of at the surface.

Still further, a slug of the inert gas foam may also be placed into the disposal zone after the waste gas foam has been placed in those situations where an injection well may later be converted to a producing well. The inert gas foam will displace the waste gas foam outward into the formation away from the injection well where it will not be immediately reproduced when the injection well is converted to a producing well.

What is claimed is:

1. In a method for recovering hydrocarbons from a subterranean formation, said method comprising:
    producing said hydrocarbons from said formation, said hydrocarbons including a waste gas having a low BTU content;
    separating said waste gas from said hydrocarbons;
    forming a foam with said waste gas wherein said waste gas is effectively trapped in said foam; and
    placing said waste gas foam into the zone of said formation from which said hydrocarbons have been produced.

2. The method of claim 1 wherein said foam is formed by combining a foam-forming surfactant-liquid mixture with said waste gas.

3. The method of claim 2 wherein said step of placing said foam in said formation comprises:
    injecting said mixture and said gas simultaneously into said formation wherein said foam is formed as it enters said formation.

4. The method of claim 2 wherein said step of placing said foam in said formation comprises:
injecting said mixture into said formation; and subsequently injecting said gas into said formation wherein said foam is formed in situ within said formation.

5. The method of claim 1 including:
combining a surfactant-liquid mixture with an inert gas to form a foam in which said inert gas is effectively trapped within said foam; and
placing said inert gas foam into said subterranean formation prior to placing said waste gas foam in said formation.

6. The method of claim 5 including:
placing additional said inert gas foam into said subterranean formation after placing said waste gas foam.

* * * * *